United States Patent [19]
Uno et al.

[11] 3,769,886
[45] Nov. 6, 1973

[54] SHUTTER OPERATING MECHANISM HAVING AN AUTOMATIC EXPOSURE TIME CONTROL MEANS FOR PHOTOGRAPHIC CAMERA

[75] Inventors: Naoyuki Uno; Katsuhiko Nomura, both of Kawagoe; Tadazumi Sakazaki; Koichiro Watanabe, both of Tokyo; Katsuhiko Miyata, Kawasaki; Fumio Urano, Tokyo, all of Japan

[73] Assignee: Asahi Kogaku Kogyo Kabushiki Kaisha, Tokyo-to, Japan

[22] Filed: July 27, 1972

[21] Appl. No.: 275,784

[30] Foreign Application Priority Data
Aug. 6, 1971   Japan................ 46/69820

[52] U.S. Cl................. 95/10 C, 95/53 E
[51] Int. Cl. ............................. G03b 9/62
[58] Field of Search .......... 95/10 C, 10 CE, 10 CT, 95/53 E, 53 EB, 53 EA

[56] References Cited
UNITED STATES PATENTS
| | | |
|---|---|---|
| 3,500,729 | 3/1970 | Rentschler..................... 95/53 EB |
| 3,422,738 | 1/1969 | Mori et al........................ 95/10 CT |
| 3,673,415 | 6/1972 | Yoshimura et al. ............. 95/10 CT |
| 3,326,103 | 6/1967 | Topaz............................. 95/10 CT |

Primary Examiner—Samuel S. Matthews
Assistant Examiner—Russell E. Adams, Jr.
Attorney—Robert L. Parker et al.

[57] ABSTRACT

A photographic camera with an automatic exposure control means, an exposure time control circuit for initiating the closure of the camera shutter and a film frame number indicating mechanism having non-usable and usable frame indications. A shutter closure urging circuit is operably connected into the exposure time control circuit and has connected therein a switch to render effective and ineffective the shutter closure urging circuit. A lever actuates the switch to render effective the shutter closure urging circuit when the indicating mechanism is providing the non-usable frame indication and for rendering ineffective the shutter closure urging circuit when the indicating mechanism is providing the usable frame indication.

7 Claims, 6 Drawing Figures

SHUTTER OPERATING MECHANISM HAVING AN AUTOMATIC EXPOSURE TIME CONTROL MEANS FOR PHOTOGRAPHIC CAMERA

BACKGROUND OF THE INVENTION

In loading new film into a camera, after the film is set into the film transport mechanism, an exposed lead of film is transported by taking fictitious shots. During the taking of fictitious shots, light which would otherwise be incident upon the film is often intercepted by mounting a lens cap over the taking lens or simply with the hand, partly from habit. As a result, photographic cameras of the type in which the exposure time (shutter open) is controlled according to a photometric value (determined by the amount of light coming through the objective lens from an object to be photographed) is set into a state of exposure for a long period of time during the taking of fictitious shots. As a result, a relatively long time is necessary for taking the fictitious shots and the user may often start the next transport of film carelessly neglecting the fact that the shutter is still open.

SUMMARY OF THE INVENTION

The present invention provides an improved shutter operating mechanism in which fictitious shots may be easily and safely taken with the lens covered by eliminating the long period of time during which the shutter is open.

DESCRIPTION OF THE PREFERRED EMBODIMENT

Figure 1:
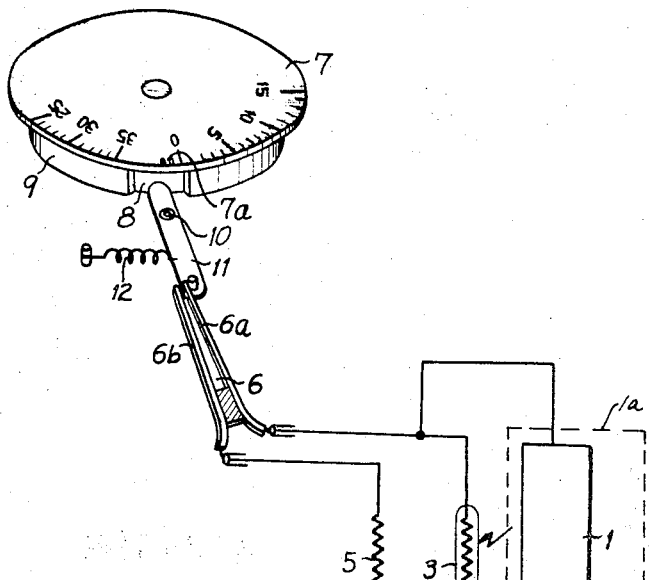
FIG. 1 is a perspective and schematic block diagram view showing a preferred embodiemnt of the mechanism according to the present invention.

Consider now the details of the present invention. As shown in the embodiment of FIG. 1, a conventional shutter closure starting circuit 1 is included in a conventional automatic exposure time control circuit 1a, the latter of which determines a value of regulated time and controls an electromagnet (not shown) to start shutter closure. Circuit 1 operates in cooperation and under control of functional circuit elements such as a photosensitive element 3 included in a photometric circuit and a source switch 4 for power source batter 2 in a conventional manner well known in the camera art. The closure start circuit is controlled in accordance with the amount of light received by photosensitive element 3. A resistor 5 has a low resistance value in relation to the resistance of the element 3. The resistor 5 is connected in series with a switch 6 of normally opened type and the resulting serial circuit is connected in parallel with the photosensitive element 3.

A film frame number indicating mechanism includes an indicator disk 7 with a recess 8 and a cam 9 which is connected so as to rotate in unison with the indicator disk 7. Adjacent to a peripheral surface of the cam 9 there is positioned an operative end of a mechanical linkage or lever 11 which is rotatably journaled. Another operative end of the lever 11 is adjacent to a movable contact 6a of the switch 6. A spring 12 is connected to lever 11 so as to normally bias the lever 11 so that the movable contact 6a is forced against an opposed contact 6b. The relationship between the first operative end of the lever 11 and the recess 8 of the cam 9 is selected so that the first operative end comes into the recess 8 when the indicator disk 7 is below the "0" end of the scale and indicates a graduation 7a corresponding to the fictitious shot.

Figure 4:
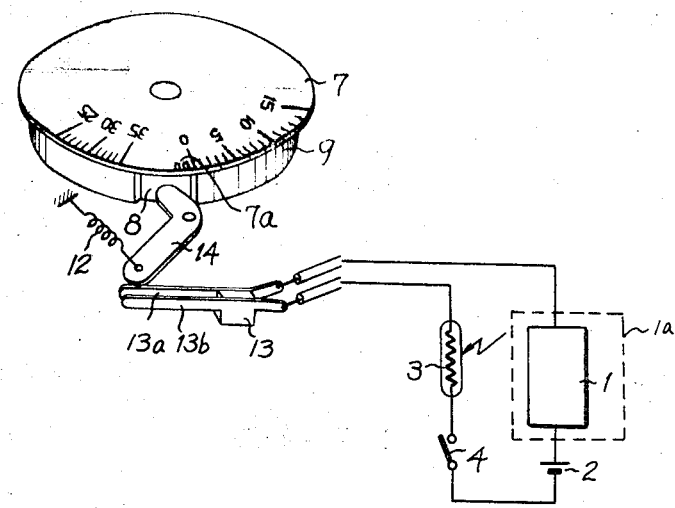
FIG. 4 is a perspective and schematic block diagram view showing an alternate preferred embodiment of the present invention.
Figure 5:
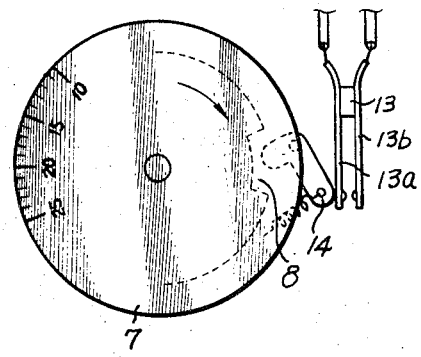
FIGS. 5 and 6 are plan views of the mechanical portions of the alternate preferred embodiment of FIG. 4 in different states.
Figure 6:
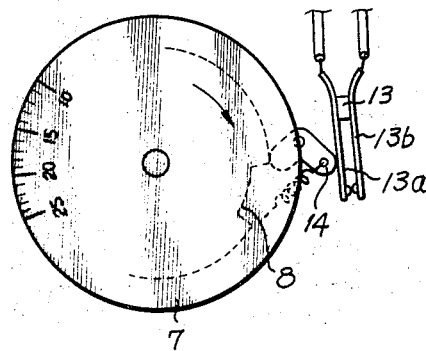

An alternate embodiment of the present invention is shown in FIG. 4. The same numerals used in FIG. 1 are used to designate the same elements in FIG. 4. Switch 6 is replaced by a switch 13 of normally opened type which is serially inserted into the circuit with the power source battery 2, the time control circuit 1a, and switch 4. The lever 11 of FIG. 1 is replaced by a rotatably journaled lever 14. When an operative end of lever 14 comes in contact with the recess 8, the contacts 13a and 13b of switch 13 are opened (FIG. 5). When the operative end of lever 14 contacts the peripheral surface of cam 9, another operative end of lever 14 forces movable contact 13a against opposed contact 13b, closing the circuit (FIG. 6).

Referring again to the embodiment of FIG. 1, the mechanism according to the present invention is arranged as above mentioned by way of example, upon or after opening the rear cover of the camera to load new film so that the film frame number indicating mechanism is automatically or manually returned to the graduation 7a for a fictitious shot. As a result, the first operative end of the lever 11 falls into the recess 8 of the cam 9. In this state, the lever 11 is rotated under action of the spring 12 clockwise as seen in FIG. 1. with the second operative end thereof forcing the movable contact 6a against the opposed contact 6b. Switch 6 is closed and the resistor 5 with its relatively low impedance value is inserted in parallel with the photosensitive element 3 (see FIG. 2).

After new film has been loaded into the camera, and the rear cover of the camera is closed again, the fictitious shots are taken by operating the shutter button. When the camera shutter button is depressed for actuating the opening of the shutter after a frame of exposed film has been transported, the control circuit 1a operates with an exposure time determined essentially only by the low resistance value of the resistor 5 previously connected in parallel with photosensitive element 3. The exposure time is relatively short because of the relatively low resistance value of the resistor 5 even if the objective remains capped. Shutter closure occurs immediately after each release operation, allowing the immediate transport of the next frame of exposed film as described above.

Figure 2:
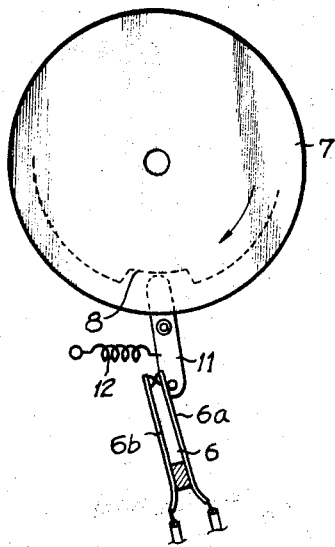
FIGS. 2 and 3 are plan views of the mechanical portions of the preferred embodiment of FIG. 1 in different states.
Figure 3:
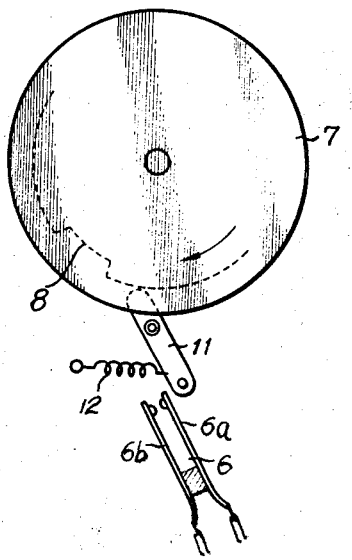

After several fictitious shots, the first operative end of the lever 11 is urged by an edge of the recess 8 from the position as shown by FIG. 2 counterclockwise as seen in FIG. 2 against action of the spring 12 to a position in which the first operative end rides on the periphery of the cam 9. Consequently, the second operative end of the lever 11 retracts out of a region in which the second operative end acts upon the movable contact 6a of the switch 6, opening the switch 6 (this corresponds to the state as shown by FIG. 3). Thus, the automatic exposure time control circuit restores to its normal state so as to control the exposure time in accordance with light intensity of an object to be photographed which is detected by the photosensitive element 3.

In the embodiment as shown by FIG. 4, the second operative end of the lever 14 is out of engagement with the movable contact 13a of the switch 13 during operation of fictitious shots since the first operative end of the lever 14 falls into the recess 8 of the cam 9 and, as a result, the lever 14 is rotated under action of the spring 12 clockwise as seen in FIG. 4. Consequently, the switch 13 is in opened state and the operating circuits such as the shutter closure starting circuit 1 is kept from energization. When the shutter closure starting circuit 1 is of the type such that the electromagnetic mechanism to start shutter closure is deenergized and thereby shutter closure is started, i.e., of so-called demagnetization type, the shutter closure occurs substantially at the moment of the shutter opening operation. The manner in which this embodiment operates during operation of fictitious shots is, therefore, identical to the manner of operation in the previous embodimet and is illustrated in FIG. 5. The lever 14 is urged by the edge of the cam 9, at the position on which the indicator disk 7 indicates the fraguation corresponding to zero value, counter-clockwise as seen in FIG. 5 against action of the spring 12 while the second operative end of said lever 14 forces the movable contact 13a against the opposed contact 13b so as to close the switch 13. When the source switch 4 operatively associated with operation such as transport of film is closed, connection between the power source battery 2 and the circuit section is established and thereafter the exposure time control is normally effected.

With the mechanism of the present invention, as seen from the foregoing description, a shutter closure urging circuit is inserted into the shutter closure starting circuit in the form that a resistor circuit is inserted in parallel to the photosensitive element and thereby shutter operation is effected under control of a relatively short exposure time which is, in turn, determined by the resistor included in said shutter closure urging circuit substantially irrelative to the intensity of light incident upon said photosensitive element. And it is possible to activate the automatic exposure time control means in the state of shutter operation for a short time even when the objective is capped during operation of fictitious shots. Thus, operation of fictitious shots is easily done without any inconvenience.

Although the shutter closure urging circuit in the mechanism according to the present invention has been shown as two embodiments, the one inserted in parallel to the photosensitive element and the other serially inserted into the source circuit, this circuit may be serially or parallelly inserted at the positions in the shutter closure starting circuit that influence the time point of shutter closure starting such as in series or in parallel to a trigger bias circuit included in a switching transistor circuit, an electromagnet or an output transistor included in a circuit fo energization of said electromagnet without departure from the scope of the invention.

What is claimed is:

1. A photographic camera having an automatic exposure control means, the combination comprising:
   a. an exposure time control circuit including a shutter closure starting circuit;
   b. a shutter closure urging circuit operably connected into said shutter closure starting circuit and having connected therein switch means to render effective or ineffective said shutter closure urging circuit;
   c. film frame number indicating mechanism having a range for usable frame indications and at least one non-usable frame indication; and
   d. means for actuating said switch means to render effective said shutter closure urging circuit in response to said indicating mechanism being positioned at said non-usable frame indication and for rendering ineffective said shutter closure urging circuit in response to said indicating mechanism being positioned at said at least one usable frame indication.

2. A photographic camera with an automatic exposure control means, an exposure time control circuit having a shutter closure starting circuit, and a film frame number indicating mechanism having non-usable frame indication and usable frame indication, the improvement comprising:
   a. a shutter closure urging circuit operably connected into said shutter closure starting circuit and having connected therein a switch means to render effective and inffective said shutter closure urging circuit; and
   b. means for actuating said switch means to render effective said shutter closure urging circuit in response to said indicating mechanism being positioned at said non-usable frame indication and for rendering ineffective said shutter closure urging circuit in response to said indicating mechanism being positioned at said usable frame indication.

3. A photographic camera with an automatic exposure control means, an exposure time control circuit for initiating the closure of the camera shutter and a film frame number indicating mechanism having non-usable frame indication and usable frame indication, the improvement comprising:
   a. a shutter closure urging circuit operably connected into said exposure time control circuit and having connected therein a switch means to render effective and ineffective said shutter closure urging circuit; and
   b. means for actuating said switch means to render effective said shutter closure urging circuit in response to said indicating mechanism being positioned at said non-usable frame indication and for rendering ineffective said shutter closure urging circuit in response to said indicating mechanism positioned at said usable frame indication.

4. A photographic camera according to claim 3 wherein said means for actuating comprises a cam movable with changes in said frame number indicating mechanism and a mechanical linkage actuated by said cam for actuating said switch means.

5. A photographic camera according to claim 4 wherein said switch means comprises a mechanical switch.

6. A photographic camera according to claim 3 wherein said camera comprises a photosensitive element operatively coupled to said exposure time control circuit for controlling the same in accordance with the amount of received light, said shutter closure urging circuit comprising an impedance element coupled in parallel with said photosensitive element through said switch means.

7. A photographic camera according to claim 3 wherein said camera comprises a photosensitive element operatively coupled to said exposure time control circuit for controlling the same in accordance with the amount of received light, said shutter closure urging circuit comprising said switch means coupled for connecting and disconnecting said photosensitive element from said exposure time control circuit.

* * * * *

UNITED STATES PATENT OFFICE
CERTIFICATE OF CORRECTION

Patent No. 3,769,886      Dated Nov. 6, 1973

Inventor(s) Naoyuki Uno; Katsuhiko Nomura; Tadazumi Sakazaki; Koichiro Watanabe; Katsuhiko Miyata and Fumio Urano It is certified that error appears in the above-identified patent and that said Letters Patent are hereby corrected as shown below:

Col. 1, line 32, "embodiemnt" should read --embodiment--;
        line 55, "batter" should read --battery--;

Col. 3, line 21, "embodimet" should read --embodiment--;
        line 24, "fraguation" should read --graduation--;
        line 59, "fo" should read --for--.

Signed and sealed this 23rd day of April 1974.

(SEAL)
Attest:

EDWARD M. FLETCHER, JR.      C. MARSHALL DANN
Attesting Officer      Commissioner of Patents